United States Patent [19]

Poqué et al.

[11] Patent Number: 5,524,687
[45] Date of Patent: Jun. 11, 1996

[54] PNEUMATIC RADIAL VEHICLE TIRE WITH FILAMENT-REINFORCED BELT PLY

[75] Inventors: Dionysius Poqué; Stephan Kessel, both of Aachen, Germany

[73] Assignee: Uniroyal Englebert Reifen GmbH, Aachen, Germany

[21] Appl. No.: 322,310

[22] Filed: Oct. 12, 1994

[30] Foreign Application Priority Data

Oct. 12, 1993 [DE] Germany ............... 43 34 650.2

[51] Int. Cl.$^6$ ............... B60C 9/18; B60C 9/20
[52] U.S. Cl. ............... 152/527; 152/526; 152/537
[58] Field of Search ............... 152/527, 537, 152/526, 533, 198, 200

[56] References Cited

U.S. PATENT DOCUMENTS

| | | | |
|---|---|---|---|
| 3,802,982 | 4/1974 | Alderfer | 152/527 X |
| 5,332,017 | 7/1994 | Imamiya et al. | 152/527 |

FOREIGN PATENT DOCUMENTS

| | | |
|---|---|---|
| 322997 | 8/1974 | Austria . |
| 0332449 | 9/1989 | European Pat. Off. . |

*Primary Examiner*—Adrienne C. Johnstone
*Attorney, Agent, or Firm*—Robert W. Becker & Associates

[57] ABSTRACT

A pneumatic vehicle tire having a radial carcass and, disposed radially outwardly thereof, a belt with at least two plies that are disposed one above the other in a radial direction. Each of the belt plies contains individual filaments of metal wire that are disposed parallel to one another. Each of the filaments, within a circumferential plane, extends at an angle to the circumferential direction of the tire from one belt side that axially delimits the belt to the other belt side that axially delimits the belt, with the individual filaments of two radially superimposed belt plies being respectively oriented diagonally and crossed relative to one another. The individual filaments have a wavelike or helical configuration in the circumferential plane, and have amplitudes that in the circumferential direction are distributed in a random manner.

15 Claims, 2 Drawing Sheets

PNEUMATIC RADIAL VEHICLE TIRE WITH FILAMENT-REINFORCED BELT PLY

BACKGROUND OF THE INVENTION

The present invention relates to a pneumatic vehicle tire having a radial carcass and a belt disposed thereabove.

It is customary to provide pneumatic vehicle tires having a radial carcass with a belt that is disposed over the radial carcass and that comprises a number of superimposed belt plies. To increase the elastic force absorption capacity for stresses that occur during operation, the belt plies are built up of parallel steel cords. In this connection, for pneumatic vehicle tires having radial carcasses it is customary to dispose the steel cords of the individual plies in such a way that the steel cords of one ply, when viewed in the circumferential direction, extend at an angle to the equatorial plane of the tire, with the steel cords of the ply disposed thereabove also extending at an angle to the equatorial plane as viewed in the circumferential direction, although extending at an angle in the opposite axial direction of the tire, so that the wire cords of adjacent plies are disposed diagonally and crossed relative to one another. Each of the steel cords is built up in a straightforward manner from a number of individual, twisted together wire filaments. The filaments extend from one side of the tire that delimits the tire in the axial direction, over the equatorial plane, to the other side of the tire that delimits the other axial side of the tire. This known crossing arrangement of the steel cords, including the known radial orientation of the textile filaments of the radial carcass, enables the optimum form of a force absorption triangle for absorbing the forces that act upon the tire during operation.

Due to their formation from a plurality of wire filaments, such steel cords are, on the one hand, dead weight, thus causing an undesirable increase of the rotating dead weight of the tire during operation, and on the other hand also cause problems of fretting due to friction between the filaments disposed in the steel chord. On the other hand, such steel cords very reliably enable the absorption of the forces that act upon the tire during operation. It is therefore desirable to replace the steel cords in the steel belt that are built up in a multi-filament manner, while maintaining their advantageous diagonal and crossing orientation in conventional belts of individual steel cords that extend from one side of the tire to the other, and also while maintaining the reliability of the tire, with individual filaments that are more favorable from a weight standpoint, are more cost effective, and cause no problems with respect to possible fretting phenomena.

Up to now, such wire filaments have not been widely used since although the individual wire filaments have the aforementioned advantages, they can easily break at relatively low compressive and tensile stresses.

EP-OS 0 32 449 discusses the use of wire filaments in the belt of a tire. These wire filaments are oriented parallel to one another in the circumferential direction. In order with such wire filaments that extend parallel to the circumferential direction to also enable the adsorption of force as close as possible to the form of a triangular orientation, the wire filaments that are oriented in the circumferential direction are uniformly waved in the circumferential direction with large wavelengths. Here also there is an increased danger that the individual filaments will break already at relatively low stresses. The identical arrangement of the amplitudes of the individual filaments in the circumferential direction leads to regions that uniformly repeat themselves in the circumferential direction and have particularly poor force absorption capacities, with all of the parallel filaments having an amplitude and to which thus only those forces can be transmitted through the belt that extend in the circumferential direction. This force absorption property that repeats itself at regular intervals in the circumferential direction brings with it an increased danger of filament breakage, as well as an unfavorable oscillation property due to the occurrence of highly harmonic disruptions, which also has a negative impact upon the quietness of rotation of the tire with respect to the generation of noise during operation, and also has a negative impact upon the uniformity of wear.

It is therefore an object of the present invention to provide a pneumatic vehicle tire having a radial carcass and steel belt that enables the advantages of the conventional diagonal and crossing arrangement of the steel cords of the steel belt to be combined with the advantages of the use of individual filaments, while improving the rotational operational characteristics.

SUMMARY OF THE INVENTION

The pneumatic vehicle tire of the present invention is characterized primarily in that a number of the individual metallic filaments of at least one of the belt plies have different wave or winding lengths, or are irregularly phase offset relative to one another. The wavelike or helical configuration of the individual filaments, and their diagonal and crossing disposition in the belt, enables the absorption of stress of forces that act upon the tire in a tested conventional manner while providing a force absorption triangle. The wavelike or helical configuration of the individual filaments within this crossing arrangement thereby enables the increase of the breaking elongation of the individual filament. The use of individual filaments provides an economical build up of the steel belt in a fretting-free manner compared to the use of steel cords. The different wave or winding lengths of the individual filaments of at least one belt ply enables a reduction of accumulative parallel positions of the wire filaments in regular pitches, and hence a reduction of regularly repeating weak points with respect to the absorption of force. Due to the random amplitude configuration, the undesired formation of highly harmonic disruptions in the tire, which can have a negative impact upon the quietness of the tire and the uniformity of wear, is to a great extent reduced.

An irregular phase offset of individual filaments relative to one another enables a reduction of the regularity in the force absorption properties and hence enables the reduction of possible harmonic disruptions.

By providing the individual filaments with amplitudes that are formed in different planes that are not parallel to the circumferential plane it is possible to also reduce regularly repeating weak spots in other planes with respect to the absorption of forces. By avoiding regularities between the amplitude position of the amplitudes in non-parallel planes and the amplitude position of amplitudes in the circumferential plane, the effect of regularly occurring weak spots and the occurrence of highly harmonic disruptions can be reduced still further. By arranging the amplitudes of the individual filaments relative to one another in a random manner, the effect of avoiding irregularities with respect to the amplitude arrangement is particularly great.

In the pitch regions where the individual filaments have their amplitudes, others have no amplitude. Thus, the force absorption property can be kept nearly constant over the entire circumference. By means of a statistically uniform distribution of amplitudes over the circumference, i.e. they are not uniformly distributed over the circumference, but rather when viewed statistically the same number of amplitudes are disposed in each circumferential surface region, it is possible to achieve an extensively constant force absorption characteristic over the entire circumferential surface. By avoiding any regularity in the arrangement of the individual amplitudes relative to one another, harmonic disruptions can to a large extent be avoided.

The embodiment of the individual filaments with short wavelengths in the range between 1 and 40 times the diameter of the filament, provide the filaments with sufficient stability and flexibility to absorb the stresses that act upon the tire during operation, with the stresses in part being of an intermittent jerky manner. Very short wavelengths in the range of between 5 and 15 times the diameter of the filament are particularly advantageous with regard to the elastically dampening force absorption capacity. The short wavelengths prevent too great of an elongation property.

By providing the amplitudes in a range of between 0.1 to 2 times the diameter of the filament, and preferably in a range of between 0.2 and 0.4 times the diameter of the filament, a merely small elongation characteristic of the individual filaments is ensured. This provides for a long service life of the tire.

The quantity of filaments in the zenith portion of the tire ranges between 30 and 200 individual filaments per 0.1 meter width of the belt ply viewed perpendicular to the orientation of the filaments, and provides the tire with sufficient stability and strength at a low tire weight. Particularly favorable, with adequate stability and low weight, is a range of between 80 and 120 individual filaments.

A selective adhesive mixture of the belt with a tensile strength of greater than 14×106 pascal at 300% modulus at isothermic specimen vulcanization pursuant to DIN (German Industrial Norm) 53504-R1 serves for the optimum embedment of the filaments and optimum stress absorption capacity.

Steel filaments having a strength in the range of between 1900 to 3500 N/mm$^2$, preferably 2100 to 3000 N/mm$^2$, are advantageous with respect to an optimum permanent load.

Further specific features of the present invention will be described in detail subsequently.

BRIEF DESCRIPTION OF THE DRAWINGS

The objects and advantages of the present invention, will appear more clearly from the following specification in conjunction with the accompanying schematic drawings, in which.

DESCRIPTION OF THE PREFERRED EMBODIMENTS

Figure 1:
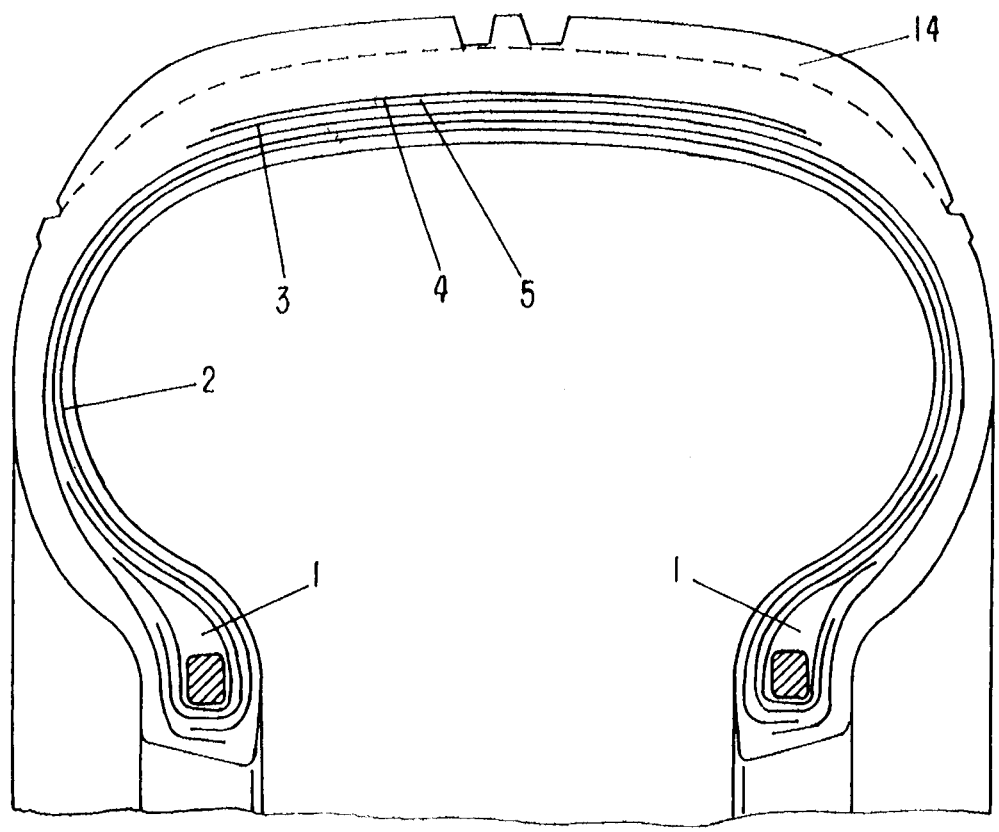
FIG. 1 is a cross-sectional view through a tire having a radial carcass and a belt disposed thereabove.

Referring now to the drawings in detail, FIG. 1 illustrates a schematic buildup of a cross-sectional area of a tire, including a multi-layer radial carcass 2 that is guided from one bead core 1, over the tire shoulders, to the other bead core 1. A belt 3, comprised of several belt plies, in FIG. 1 the belt plies 4 and 5, is disposed above the radial carcass 2, which is embedded in rubber, and also extends in the circumferential direction as does the radial carcass 2. The tire structure is radially bounded by the tread 14.

Figure 2:
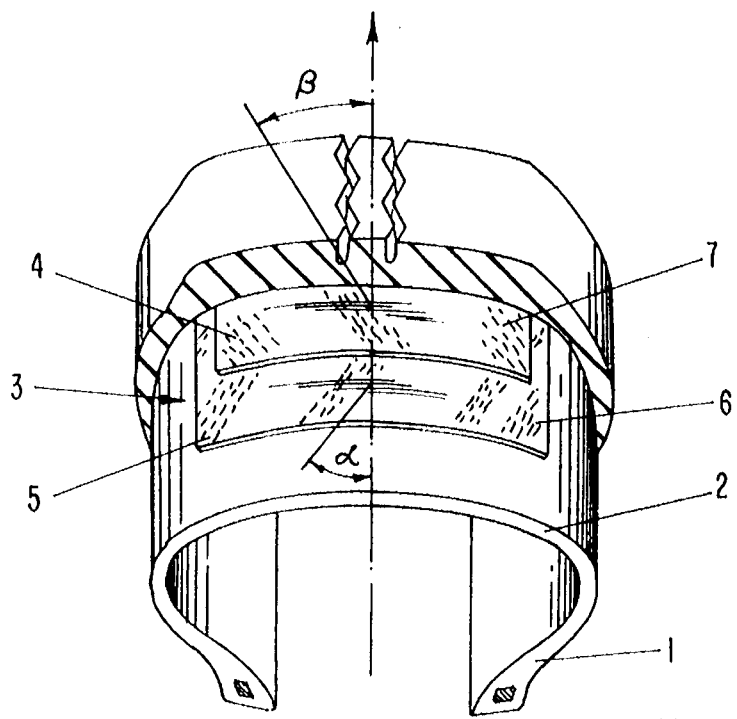
FIG. 2 is a perspective cross-sectional view of a tire containing the inventive individual filaments.

As can be seen from FIG. 2, each of the belt plies 4 and 5 comprises parallel strength carriers 6 or 7, which extend at an angle α or β respectively relative to the equatorial plane of the tire. The strength carriers are individual filaments of steel wire that extend from one side, which when viewed in the axial direction of the tire axially delimits the pertaining belt ply, to the opposite side that axially delimits that belt ply. When viewed in the circumferential direction on the tire, which is indicated by an arrow in FIG. 2, the individual filaments 7 of the belt ply 4 are embedded in the rubber mixture of the pertaining belt ply from the right to the left side of the belt ply 4, and the individual filaments 6 of the belt ply 5 are embedded from the left to the right side of the belt ply 5. The individual filaments 7 and 6 are thus disposed in a conventional diagonal and crossing arrangement relative to one another.

Figure 3A:
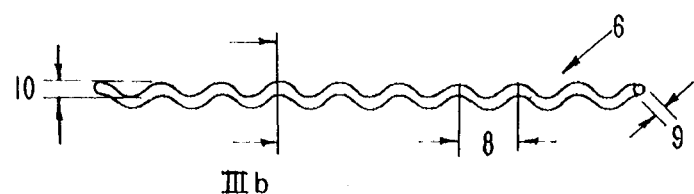
FIG. 3a shows the inventive arrangement of wavelike filaments.
Figure 3B:
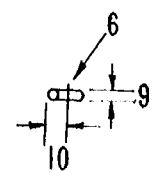
FIG. 3b is a view taken along the line IIIb—IIIb.

As can be seen from the embodiment illustrated in FIGS. 3a and 3b, the individual filaments 6 and 7 are undulated in a wavelike manner in the circumferential plane.

Figure 4:
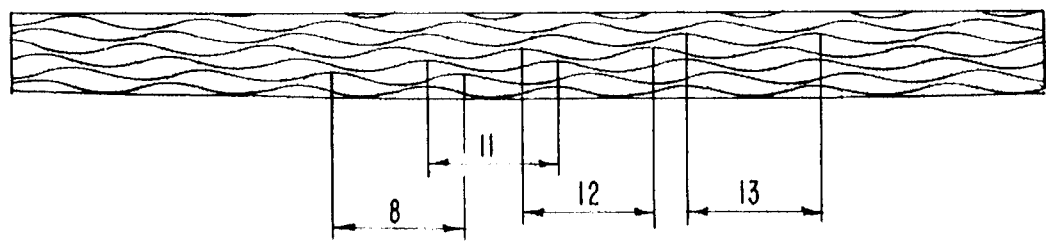
FIG. 4 shows a schematic representation of the force absorption behavior of the irregular filament arrangement according to the embodiment of FIGS. 3e and 3f.

As can be seen from the enlarged view of FIG. 4 of the filaments of a belt ply, all of the filaments 6 or 7 of a given belt ply are phase offset relative to one another and each have different wavelengths 8, 11, 12, 13 etc.

However, it is also conceivable for the individual filaments to merely have different phases or different wavelengths, or for individual filaments of a given belt ply to have the same wavelengths or be disposed in the same phase, or have both the same phase as well as the same wavelengths. However, in the last situation, it is advantageous that these do not represent part of a sequence of identically built-up filament arrangements that repeats itself periodically in the axial direction.

It is also conceivable, and for reasons of optimizing the force absorption behavior advantageous, to dispose the different individual filaments over the circumferential width in such a way, and also with respect to their wavelengths and phase displacements, that in equal transverse pitches statistically the same number of amplitudes of individual filaments are found. In this connection, it is conceivable that the individual filaments are not respectively built up of undulations of the same wavelength and same amplitude, but rather individual filaments are provided with undulations having varying wavelengths and/or varying amplitudes.

Figure 3C:
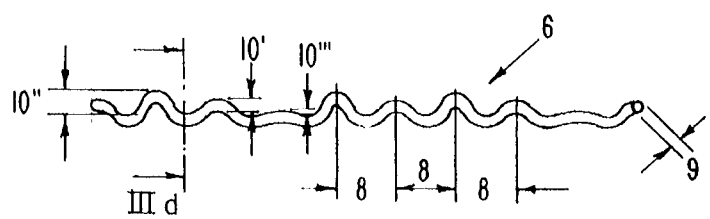
FIG. 3c shows the inventive arrangement of irregular amplitudes of filaments in the circumferential plane and in planes that are not parallel to the circumferential plane.
Figure 3D:
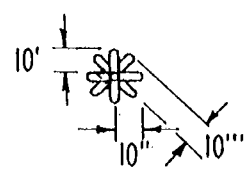
FIG. 3d is a view taken along line IIId—IIId in FIG. 3c.

Instead of the undulations of FIGS. 3a and 3b, where the individual filaments have wavelike undulations within the circumferential plane, it is also conceivable to utilize individual filaments having amplitudes in conformity with the illustrations of FIGS. 3c and 3d that are also in other planes that are not disposed parallel to the circumferential plane. As can be seen from the embodiments of FIGS. 3c and 3d, individual amplitudes 10 are conceivable in irregular distances in the circumferential plane, while other amplitudes 10' or 10" are disposed out of the circumferential plane.

Figure 3E:
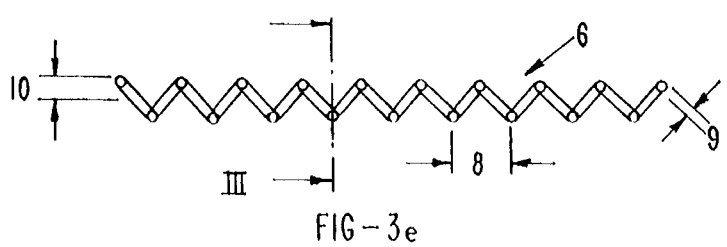
FIG. 3e shows inventive helical filaments.
Figure 3F:
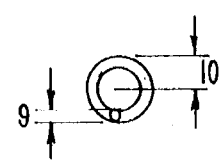
FIG. 3f is a view taken along line IIIf—IIIf in FIG. 3e.

Similarly, it is conceivable, in place of the wavelike individual filaments, to use helically undulating individual elements as illustrated, for example, in FIGS. 3e and 3f.

The selection of the amplitudes and phase displacements of the individual filaments relative to one another for the exemplary embodiments of 3c, 3d, 3e, 3f can also be undertaken in the manner described for the first embodiment of FIGS. 3a and 3b.

With all of the embodiments described, the filament diameter 9 is always constant, being between 0.22 and 0.65 mm. The filament diameter 9 is advantageously between 0.3 and 0.45 mm. The individual filaments are selected in such a way that their strength is 190–350 dN/mm$^2$, and in a preferred operating range is 210 to 300 dN/mm$^2$. The undulation amplitudes of the filaments are in the range of from 0.1 to 1.5 times the diameter. The preferred operating range is between 0.2 and 0.4 times the diameter 9. The undulation wave lengths are between 1 and 40 times the diameter 9, with the preferred operating range of the undulation wavelengths being 5 to 15 times the diameter 9.

In the zenith portion of the tire, the amount of filaments per dm in the axial direction of the tire is 30 to 200. Preferably, the quantity of steel filaments in the steel filament ply are 80 to 120 filaments per dm in the axial direction in the zenith portion of the tire. With such filaments, it is possible to keep the overall elongation of the filament to the point of breaking below 6%, preferably below 3%. The adhesive rubber mixture used for embedding the belt filaments has a tensile strength of greater than 14 megapascal, preferably greater than 18 megapascal, for the 300% modulus of elongation according to DIN (German Industrial Norm) 53504-R1 at isothermic specimen vulcanization, i.e. 25 minutes at 150°, and 11 megapascal for the 200% modulus of elongation.

The present invention is, of course, in no way restricted to the specific disclosure of the specification and drawings, but also encompasses any modifications within the scope of the appended claims.

What is claimed is:

1. A pneumatic vehicle tire having a radial carcass and, disposed radially outwardly of said radial carcass, a belt with at least two belt plies disposed one above the other in a radial direction, each of said belt plies containing individual metallic filaments that are disposed parallel to one another, each of said filaments, within a circumferential plane, extending at an angle to a circumferential direction of said tire from one belt side that axially delimits said belt in a direction toward an opposite belt side that axially delimits said belt, with said individual filaments of two radially superimposed belt plies being respectively oriented diagonally and crossed relative to one another, said individual filaments furthermore having a wavelike or helical configuration and a number of said individual filaments of at least one of said belt plies having different wave or winding lengths.

2. A pneumatic vehicle tire according to claim 1, wherein said individual filaments have amplitudes that are disposed in different planes that are not parallel to said circumferential plane.

3. A pneumatic vehicle tire according to claim 2, wherein said amplitudes in said nonparallel planes are disposed in a random manner relative to the amplitudes in said circumferential plane.

4. A pneumatic vehicle tire according to claim 1, wherein a circumferential position of the amplitudes of said individual filaments are disposed in a random manner relative to one another.

5. A pneumatic vehicle tire according to claim 1, wherein the amplitudes of said individual filaments are distributed over a circumferential surface in a statistically uniform manner.

6. A pneumatic vehicle tire according to claim 2, wherein said wave or winding lengths of said individual filaments are in a range of between 1 and 40 times the diameter of said filaments.

7. A pneumatic vehicle tire according to claim 6, wherein said wave or winding lengths are in a range of between 5 and 15 times said diameter of said filaments.

8. A pneumatic vehicle tire according to claim 1, wherein a zenith portion of said tire has a quantity of said individual filaments ranging between 30 and 200 individual filaments per 0.1 meter viewed perpendicular to an orientation of said filaments.

9. A pneumatic vehicle tire according to claim 8, wherein said quantity of filaments in said zenith portion of said tire ranges from between 80 and 120 filaments per 0.1 meter.

10. A pneumatic vehicle tire according to claim 1, wherein said individual filaments have amplitudes ranging between 0.1 and 2 times the diameter of said filaments.

11. A pneumatic vehicle tire according to claim 10, wherein said amplitudes range between 0.2 and 0.4 times said diameter of said filaments.

12. A pneumatic vehicle tire according to claim 1, wherein said individual filaments are embedded in an adhesive rubber mixture with a minimum tensile stress capacity of 14×106 pascal at a 300% modulus of elongation.

13. A pneumatic vehicle tire according to claim 1, wherein said individual filaments are steel wire filaments and have a strength in the range of between 1900 to 3500 N/mm$^2$.

14. A pneumatic vehicle tire according to claim 13, wherein said individual filaments have a strength in the range of between 2100 and 3000 N/mm$^2$.

15. A pneumatic vehicle tire according to claim 1, wherein a number of said individual filaments of at least one of said belt plies are also irregularly phase offset relative to one another.

* * * * *